United States Patent
Boonekamp et al.

(10) Patent No.: US 11,140,881 B2
(45) Date of Patent: Oct. 12, 2021

(54) ILLUMINATION SYSTEM FOR CULTIVATION OF AQUATIC ANIMALS

(71) Applicant: SIGNIFY HOLDING B.V., Eindhoven (NL)

(72) Inventors: Erik Paul Boonekamp, Eindhoven (NL); Christina Tanase, Eindhoven (NL); Martijn Evert Paul Jansen, Eindhoven (NL); Willem Franke Pasveer, Eindhoven (NL); Hilbrand Vanden Wyngaert, Eindhoven (NL); René Van Honschooten, Eindhoven (NL); Peter Johannes Martinus Bukkems, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 583 days.

(21) Appl. No.: 14/406,474

(22) PCT Filed: May 28, 2013

(86) PCT No.: PCT/IB2013/054394
§ 371 (c)(1),
(2) Date: Dec. 8, 2014

(87) PCT Pub. No.: WO2013/186651
PCT Pub. Date: Dec. 19, 2013

(65) Prior Publication Data
US 2015/0136037 A1    May 21, 2015

Related U.S. Application Data

(60) Provisional application No. 61/659,555, filed on Jun. 14, 2012.

(51) Int. Cl.
*H01R 33/00* (2006.01)
*A01K 61/00* (2017.01)
(Continued)

(52) U.S. Cl.
CPC .............. *A01K 61/00* (2013.01); *A01K 61/13* (2017.01); *A01K 61/60* (2017.01); *A01K 61/80* (2017.01);
(Continued)

(58) Field of Classification Search
CPC ........ A01K 61/60; A01K 61/80; A01K 61/00; A01K 61/02; A01K 61/17; A01K 63/00;
(Continued)

(56) References Cited

U.S. PATENT DOCUMENTS 2,847,066 A * 8/1958 Joseph .................. A01K 61/85
222/48
4,936,253 A * 6/1990 Otamendi-Busto .... A01K 61/60
119/223

(Continued)

FOREIGN PATENT DOCUMENTS

CN     201004923 Y  *  1/2008
CN     201278751 Y     7/2009
(Continued)

OTHER PUBLICATIONS

1. Fao: World Review of Fisheries and Aquaculture, 2008.
(Continued)

*Primary Examiner* — Thien M Le
*Assistant Examiner* — Tae Kim
(74) *Attorney, Agent, or Firm* — Daniel J. Piotrowski

(57) ABSTRACT

There is provided an illumination system (100) for cultivation of aquatic animals. The illumination system (100) comprises at least one light source (110) emitting light, at least one light driver (120) arranged to drive the at least one light source (110), at least one light sensor (130) providing illuminance data for at least one point of interest (50) in said illumination system (100), and a controller (140). The controller (140) is adapted to provide control signals to the at
(Continued)

least one light driver (120) driving the at least one light source (110) to emit light of a desired illuminance at the at least one point of interest (50). An ambient light sensor may be applied to determine control signals also in accordance with ambient light data.

13 Claims, 9 Drawing Sheets

(51) Int. Cl.
*A01K 61/13* (2017.01)
*A01K 61/80* (2017.01)
*A01K 63/06* (2006.01)
*H05B 47/11* (2020.01)
*H05B 45/12* (2020.01)
*A01K 61/60* (2017.01)

(52) U.S. Cl.
CPC ............ *A01K 63/06* (2013.01); *H05B 45/12* (2020.01); *H05B 47/11* (2020.01); *Y02A 40/81* (2018.01)

(58) Field of Classification Search
CPC ...... A01K 63/003; A01K 63/06; A01K 79/02; A01K 97/02; C12M 21/02; C12M 23/18; C12M 23/58; C12M 31/10; E02B 17/00
USPC ........................................................ 362/642
See application file for complete search history.

(56) References Cited

U.S. PATENT DOCUMENTS

| | | | |
|---|---|---|---|
| 6,203,170 B1 | 3/2001 | Patrick | |
| 2005/0135104 A1 | 6/2005 | Crabb et al. | |
| 2006/0230667 A1 | 10/2006 | Heath | |
| 2007/0268702 A1 | 11/2007 | McFadden | |
| 2009/0109675 A1 | 4/2009 | Navarro Alvarez | |
| 2010/0218727 A1 | 9/2010 | Huges | |
| 2010/0267126 A1* | 10/2010 | Jacobs | A01K 63/00 435/292.1 |
| 2010/0293831 A1 | 11/2010 | Hreinsson | |
| 2011/0174232 A1 | 7/2011 | Hoie | |
| 2011/0249260 A1 | 10/2011 | Duer | |
| 2011/0307976 A1* | 12/2011 | Ploechinger | B32B 7/03 800/296 |
| 2013/0152864 A1* | 6/2013 | Grajcar | F21V 29/58 119/204 |
| 2013/0174792 A1* | 7/2013 | Delabbio | A01K 63/06 119/200 |

FOREIGN PATENT DOCUMENTS

| | | | | |
|---|---|---|---|---|
| GB | 2099274 A | * | 12/1982 | ............. A01K 61/80 |
| JP | 2000060350 A | * | 2/2000 | |
| JP | 2010101895 A | | 5/2010 | |
| JP | 2012098066 A | * | 5/2012 | |
| KR | 20120033432 A | * | 4/2012 | |
| WO | 2010142004 A2 | | 12/2010 | |
| WO | 2011019288 A2 | | 2/2011 | |
| WO | 2013090505 A1 | | 6/2013 | |
| WO | 2013096840 A1 | | 6/2013 | |

OTHER PUBLICATIONS

2. G. Boeuf, P.-Y. Le Bail, Does light have an influence on fish growth?, Aquaculture 177, 129-152, 1999.
3. N. Villamizar et al., Effects of light during early larval development of some aquacultured teleosts: A review, Aquaculture, In Press.
4. I.Philip et al., Daily and seasonal patterns in the feeding behaviour of Atlantic salmon (Salmo salar L.) in a sea cage, Aquaculture 1, 165-178,1993.

* cited by examiner

ILLUMINATION SYSTEM FOR CULTIVATION OF AQUATIC ANIMALS

CROSS-REFERENCE TO PRIOR APPLICATIONS

This application is the U.S. National Phase application under 35 U.S.C. §371 of International Application No. PCT/IB2013/054394, filed on May 28, 2013, which claims the benefit of U.S. Provisional Patent Application No. 61/659,555, filed on Jun. 14, 2012. These applications are hereby incorporated by reference herein.

FIELD OF THE INVENTION

The present invention relates to the field of illumination systems for fish cultivation in sea cages. In particular, the present invention relates to an illumination system for cultivation of aquatic animals, an arrangement containing such an illumination system, and a method for controlling light in such an illumination system.

BACKGROUND OF THE INVENTION

The behavior of fish or other aquatic animals in their natural environment depends on a number of factors such as temperature, light quality, oxygen concentration, water PH. The amount of fish or the density of fish in a certain area is also strongly determined by environmental factors in that area. Highly intensive fish cultivation takes place depending on the species and developmental stage in fresh water or in marine water. Currently, the majority of e.g. the on-growing Atlantic salmon production takes place in marine net cages or sea cages. Generally fish have a natural tendency to avoid a high light intensity. However, the drive to eat is stronger than the tendency to avoid the high light intensity close to the water surface. Feeding the fish in sea cages is presently done by using feeders that spread feed palets at the water surface and creates the situation that food uptake takes place close to the water surface. Therefore, a stressful situation arises due to the high density of fish around the "feeding spots" close to the water surface and due to the high light intensity.

In water cages, such as marine net cages or sea cages, the lighting conditions can be influenced by using artificial light placed mainly in the water while the other environmental factors such as the temperature or the oxygen concentration can only be influenced by initial positioning of the cage or net.

Consequently, several devices and methods using light sources to control light and thereby the behavior of fish in such environments have been developed.

U.S. Pat. No. 6,203,170 B1 discloses a device for attracting and/or repelling fish. The device comprises an array of visible light emitting diodes encased in a water resistant, protective housing which is substantially transparent to the light emitted by the diodes. The emitted light has a wavelength which either attracts or repels fish and is used for guiding the movements of the fish. A controller communicating with both the device and a feed dispenser can for instance cause the device to illuminate for predetermined periods, during which a predetermined amount of food is dispensed.

However, there is still a need for an efficient solution on how to use artificial lighting in such environments in order to obtain an improvement in both fish welfare and food uptake. There is also a need for a solution creating an increased productivity of sea cages for fish cultivation.

SUMMARY OF THE INVENTION

In view of the above it is desirable to provide an effective artificial lighting solution or an illumination system which is able to improve the yield and productivity of sea cages for fish cultivation.

It is also desirable that such an illumination system provides a positive contribution to fish welfare by reducing stress during food uptake. Reducing stress in fish yields improved food conversion which generates bigger fish and improved specific growth rate and less diseases which generates lower mortality.

Further, it is desirable to improve the food uptake by the fish, taking into account that a considerable amount of food is typically lost during the struggle for food just below the water surface. The food which is not noticed by the fish, moves to deeper water and more unfavorable temperatures where no food uptake takes place. It would therefore be desirable to improve the food uptake, which would result in lower costs and a higher productivity of the sea cage.

Further it is also desirable to improve the uniformity of the fish population, in terms of size and weight, by decreasing the fight for food close to the water surface, which results in a more effective uptake, which again results in lower costs.

It is also desirable to obtain a better distribution of food over the total amount of fish. In addition it is desirable to improve the yield of fish, i.e. to be able to grow more fish in the same volume of water.

It is an objective of the current invention to provide an arrangement which solves or at least mitigates the issues addressed above.

According to a first aspect of the disclosure, an illumination system for cultivation of aquatic animals comprises at least one light source comprising at least one light emitting diode arranged to emit light, the at least one light source being arranged to be immersed in a body of water, at least one light (electrical) driver arranged to drive the at least one light source, at least one first light sensor arranged to provide illuminance data for at least one water volume of interest in the illumination system, the volume of interest being located in the body of water, and a controller, wherein the controller is adapted to receive a desired illuminance setpoint for the at least one point of interest; receive the illuminance data from the at least one first light sensor; determine control signals based on the received desired illuminance setpoint and the received illuminance data; provide the determined control signals to the at least one light driver, thereby driving the at least one light source to emit light of a desired illuminance at the at least one volume of interest.

An illumination system according to the present invention may advantageously comprise several light sources, or LED lamps in a sea cage. This enables producing a more or less even distribution of light points. The illumination system according to the present invention comprises immersed LED sources which can be distributed evenly over the whole volume of the sea cage. The LED sources improve the visibility of the food and avoid stressful situations during food uptake. In addition, immersed lighting improves effective food uptake (no food is lost) and improves yield/uniformity of the fish as described above. The particular advantage of LED lighting is that the little amount of generated heat generated can be easily absorbed by the water. The LED lighting also has an advantage over metal halide lamps, which cannot be distributed deeper in the sea cage.

The desired illuminance may relate to spectrum and/or color of light to be emitted by said at least one light source.

The desired illuminance may additionally relate to other aspects of the light source properties, such as flux and/or peak brightness.

In this way, the immersed first light sensor enables that the properties of the light of the light sources in the illumination system may advantageously be fine tuned with regards to aspects, such as flux, peak brightness, and spectrum. The light sources of the illumination system may be individually tuned to produce a well-defined light flux or spectrum. An illumination system according to the present invention may enable the light sources to be individually dimmed or boosted. It is possible to create a gradient of light in the water cage which may be useful to manipulate fish density, for example during feeding.

The light sources, or the light emitting diodes, may be tuned as a function of the natural light conditions in the surroundings of the sea cage. This may enable compensation for the light loss by absorption in the water.

Therefore, in a second aspect of the present disclosure, an illumination system is disclosed that is configured for cultivation of aquatic animals. The illumination system comprises at least one light source comprising at least one light emitting diode, wherein the at least one light source is arranged to be immersed in a body of water. The illumination system comprises at least one light driver arranged to drive the at least one light source to emit light at a point of interest in the body of water. The illumination system comprises at least one light sensor, that may be configured for being arranged above a surface of the body of water, to provide ambient light data. Ambient light is considered to be the light sensed above the water surface. The illumination system also comprises a controller configured to receive a desired illuminance setpoint and to receive the ambient light data of the at least one sensor and to determine control signals based on the received desired illuminance setpoint and the ambient light data. The controller is configured to provide the determined control signals to the light driver, thereby driving the at least one light source to emit light of a desired illuminance at the at least one point of interest.

The illumination system according to the second aspect enables measurement of the ambient natural light conditions (e.g. intensity and/or spectrum) at the surface (outside the water) of the body of water containing the aquatic animals. The contribution of the ambient light to the total light exposure of the aquatic animals may then be taken into account in controlling the light emitted from the at least one light source. Consequently, the same light conditions as the conditions at the surface can be applied throughout the body of water such that fish have the same visibility of food throughout the space which is beneficial to the growing process. A model may be applied within the controller to account for the contribution of the ambient light at one or more different depths.

Various applications can be envisaged. For example, the day/night rhythm of the ambient light may be followed by controlling the light emitted from the immersed at least one light source in accordance with the ambient light intensity and/or the spectrum sensed by the light sensor above the surface of the water. The contribution of the ambient light at the depth of the immersed light source will be different from the light sensed by the light sensor above the surface of the water. Accordingly, the model referred to in the previous paragraph may be applied to take this effect into account.

The second aspect of the present disclosure may or may not be combined with the first aspect of the present disclosure.

If both aspects are combined, an illumination system for cultivation of aquatic animals according to a third aspect of the disclosure is obtained. The illumination system according to the third aspect comprises at least one light source containing at least one light emitting diode arranged to emit light, wherein the light source is arranged to be immersed in a body of water. The illumination system also comprises at least one light driver arranged to drive the at least one light source. The illumination system comprises at least one first light sensor arranged to be immersed in the body of water to provide illuminance data at at least a point of interest located in the body of water. The illumination system also comprises at least one second light sensor, that may be configured to be arranged above a surface of the body of water, to provide ambient light data. A controller is provided that is configured to receive a desired illuminance setpoint and to receive the illuminance data from the at least one first sensor and the ambient light data from the at least one second sensor and to determine control signals based on the received desired illuminance setpoint, the illuminance data from the at least one first sensor and the ambient light data from the at least one second sensor. The controller is configured to provide the determined control signals to the light driver, thereby driving the at least one light source to emit light of a desired illuminance at the at least one point of interest.

The third aspect of the invention enables actual measurement of the light (intensity and/or spectrum), in particular the contribution of the ambient light, within the water by the first sensor(s). As a consequence, a model does not need to be applied and variations in water conditions (e.g. the opacity of the water and variation in the current of the water) can be accounted for. Variations in the ambient light conditions and/or in the optical parameters of the water are both translated in adapted driving parameters for the light source(s). The third aspect of the invention also enables relative control of the light conditions within the body of water with respect to the light conditions at the surface of the body of water. For example, a gradient between light conditions at the surface and light conditions within the body of water at the point(s) of interest can be controlled or set. The ambient light data may be used as input to set the desired illuminance setpoint at the point of interest located in the body of water.

Various embodiments have been envisaged in relation to the first, second and/or third aspect of the disclosure.

In an embodiment, the illumination system may comprise at least one food dispenser. Food dispensing and control of the light emitted by the light sources may be tuned from the controller to stimulate food uptake.

In an embodiment, the at least one first light sensor may be integrated with the at least one light source.

In an embodiment, the illumination system may further comprise at least one housing comprising at least one of the at least one light source, the housing being arranged to be immersed in the body of water.

In another embodiment, the at least one housing may further comprise at least one of the at least one light driver.

In an embodiment, the illumination system may further comprise an input device and the desired illuminance setpoint may be received from the input device. Alternatively, or in addition as mentioned above, the ambient light data from the second light sensor arranged above the surface of the body of water may be used as input for setting the illuminance setpoint.

In an embodiment, the illumination system according to the first, second and/or third disclosed aspect, may further comprise at least one temperature sensor arranged to provide temperature data for the at least one point of interest, and the controller may be further adapted to receive the temperature data from the at least one temperature sensor; determine control signals based also on the received temperature data (in addition to the illuminance setpoint, the illuminance data from the at least one first sensor and/or the ambient light data from the at least one second sensor); provide the determined control signals to the at least one light driver, thereby driving the at least one light source to emit light of the desired illuminance at the at least one point of interest.

In this way, the immersed LED lighting is combined with temperature sensors. This opens up the possibility to control fish to stay at the right temperatures in the sea cage.

Temperature sensors may be connected to software or a controller regulating the position and flux output or other optical characteristics (such as spectrum) of the light sources. The temperature sensors may be separate from the light sources or may be integrated onto the cable carrying the current for the light sources.

In an embodiment, the at least one temperature sensor may be integrated with said at least one light source. The temperature sensors may be integrated onto the cable carrying the current for the light sources.

In an embodiment, the illumination system may further comprise at least one position actuator arranged to adjust the depth of immersion of the at least one light source in the body of water, wherein the depth of immersion may be associated with a vertical distance between a surface of the body of water and the at least one light source, wherein the controller may be further adapted to receive a desired position setpoint for the at least one light source; determine current position data for the at least one light source; determine control signals based on the received position setpoint and the determined current position data; provide the determined control signals to the at least one position actuator, thereby positioning the at least one light source at a desired position in the body of water.

This has the advantage that the light sources may be variable in immersion depth within the body of water. This opens up the possibility that fish stay at the right temperatures in the sea cage.

In an embodiment, the position actuator may further be arranged to laterally adjust the position of the at least one light source in the body of water. This embodiment facilitates positioning the at least one light source with respect to a particular lateral position, e.g. the position of the food dispenser.

In an embodiment, the illumination system comprises a plurality of light sources, wherein each of the light sources is arranged at a different immersion depth in the body of water. Each of the light sources comprises one or more light emitting diodes arranged to emit light when driven by one or more light drivers. The illumination system comprises a plurality of first light sensors arranged with respect to one or more of the plurality of light sources to provide illuminance data for points of interest associated with each the plurality of light sensors. A controller is provided that is configured to receive a desired illuminance setpoint for each of the light sources and to receive the illuminance data from the plurality of first sensors and the ambient light data of the at least one second sensor and to determine control signals based on the received desired illuminance setpoint, the illuminance data from the plurality of first light sensors and the ambient light data from the at least one second sensor. The controller is configured to provide the determined control signals to the one or more light drivers, thereby driving the light sources to emit light of a desired illuminance at the at least one point of interest corresponding to the desired illuminance set point associated with each of the plurality of light sources. In particular, each light source may have its own associated first light sensor arranged within the light source or in the vicinity of the light source such that it can perform an appropriate light measurement at the point of interest associated with the first light sensor and to emit light in accordance with an illuminance set point associated with the point of interest.

In an embodiment, the controller is configured to determine the control signal also in dependence on at least one of the species and the stage of development of the aquatic animals. It has been found that sensitivity of e.g. fish to light profoundly changes according to the species and/or the stage of development. Specific photoreceptor cells are present in both the eye and the pineal gland of the fish and these cells evolve during growth of the fish. Fish may therefore require different light intensities and/or wavelengths during their development. Moreover, within the same developmental stage, fish is influenced by the day length (photoperiodic activity) and season. For example, salmon has different feeding behavior, reduced appetite from autumn to winter and a rapid increase in appetite from late winter onwards. Seasonal variation in behavioral indices of appetite are attributed to day length and change in day length.

As was already mentioned above, various applications of the illumination system have been envisaged. Applications may particularly relate to control of the light intensity and/or the spectral characteristics. Fish maturation may e.g. be prevented by providing the appropriate light intensity and/or light color at the appropriate time. Visibility of food may also be improved by applying appropriate light intensity and color at least during food dispensing. Improved visibility of food may result in improved growth of the fish and reduced stress level.

In one embodiment of the third disclosed aspect, the controller determines the control signal in order to maintain the sum of the light intensity at one or more points of interest sensed by the at least one first light sensor and the at least one second light sensor substantially constant over a period of time and/or substantially constant in the depth direction of the body of water. This application enables maintaining a constant light intensity within the body of water irrespective of changes in the ambient light.

In another embodiment of the second and/or third disclosed aspect, the control signal is determined to control the light emitted from the one or more light sources to map the spectrum sensed by the one or more second light sensors arranged above the surface of the body of water and/or the one or more first light sensors arranged in the body of water. As such, not only the intensity of the light but also spectral characteristics of the ambient light can be copied into the water. Simulation of sun rise and sun set within the water is accordingly enabled.

Advanced illumination schemes may be programmed in the controller in order to determine control signals for the one or more light drivers in dependence on illuminance data received from the one or more first light sensors and/or the ambient light data received from the one or more second light sensors.

For example, an illumination scheme may comprise increasing (e.g. continuously or step-wise) a light intensity level of the light emitted from the at least one light source from a first light intensity level to a second light intensity level over a time period of at least one day to two weeks, preferably at least two days to two weeks. The first light intensity level may be at least a factor 10-100 smaller than the second light intensity level. Since the ambient light will change significantly over the time period, ambient light data can be used to advantage in order to determine the control signals enabling the light intensity level to be increased according to the illumination scheme.

Another example includes increasing the light intensity level at a first rate during a first time period and at a second rate during a second time period, wherein the first rate is lower than the second rate. The advantage of the latter illumination scheme is that a lower first rate can be applied first and after the eye sensitivity level of the fish is reached, the second (higher) rate can be applied during the second time period. The first and second time periods may be consecutive periods. In order not to disrupt the illumination scheme by variations in the ambient light and/or variation in the optical characteristics of the water, the controller may determine control signals enabling compensation for any light effects sensed by the first light sensor and/or second light sensor.

The disclosure also relates to arrangements for the cultivation of aquatic animals and to methods for using the illumination system as defined above.

Therefore, according to a fourth aspect of the invention, an arrangement for cultivation of aquatic animals, the arrangement comprising an illumination system according to the first, second or third aspect is disclosed in combination with a water cage, wherein the illumination system may be arranged to illuminate the water cage and wherein the at least one point of interest may be located within the water cage.

According to a fifth aspect of the disclosure, a method for controlling light in an illumination system for cultivation of aquatic animals is obtained, the illumination system comprising at least one light source comprising at least one light emitting diode arranged to emit light, the at least one light source being immersed in a body of water, at least one light driver arranged to drive the at least one light source, at least one first light sensor arranged to provide illuminance data for at least one point of interest in the illumination system, the point of interest being located in the body of water, and a controller, the method comprising the steps of receiving a desired illuminance setpoint for the at least one point of interest; receiving the illuminance data from the at least one light sensor; determining control signals based on the received desired illuminance setpoint and the received illuminance data; providing the determined control signals to the at least one light driver, thereby driving the at least one light source to emit light of a desired illuminance at the at least one point of interest.

A sixth aspect of the disclosure relates to a method for cultivating aquatic animals in a body of water wherein ambient light data are obtained from at least one second light sensor arranged above the surface of the body of water and determining control signals for driving at least one light source based on a desired illuminance setpoint for a point of interest in the body of water and the ambient light data, thereby driving the light source to emit light of a desired illuminance at the at least one point of interest.

The sixth aspect of the present disclosure may or may not be combined with the fifth aspect of the present disclosure.

If both aspects are combined, a seventh aspect of the disclosure relates to a method for cultivating aquatic animals in a body of water wherein illuminance data are obtained from at least one first sensor at at least one point of interest located in the body of water and ambient light data are obtained from at least one second sensor arranged above the surface of the body of water. Control signals are determined for driving the at least one light source based on a desired illuminance setpoint for a point of interest in the body of water and the illuminance data from the at least one first sensor and the ambient light data from the at least one second sensor, thereby driving the at least one light source to emit light of a desired illuminance at the at least one point of interest. The ambient light data may be used as input for setting the illuminance setpoint.

Various embodiments have been envisaged for the fifth, sixth and/or seventh aspect of the disclosure.

In an embodiment, the system may further comprise at least one temperature sensor arranged to provide temperature data for the at least one point of interest, the method further comprising the steps of receiving the temperature data from the at least one temperature sensor; determining control signals based also on the received temperature data (in addition to the illuminance setpoint, the illuminance data from the at least one first sensor and/or the ambient light data from the at least one second sensor); providing the determined control signals to the at least one light driver, thereby driving the at least one light source to emit light of the desired illuminance at the at least one point of interest.

In another embodiment, the system comprises at least one position actuator arranged to adjust the depth of immersion of the at least one light source in the body of water, wherein the depth of immersion may be associated with a vertical distance between a surface of the body of water and the at least one light source, the method further comprising the steps of receiving a desired position setpoint for the at least one light source; determining current position data for the at least one light source; determining control signals based also on the received position setpoint and the determined current position data; providing the determined control signals to the at least one position actuator, thereby positioning the at least one light source at a desired position in the body of water.

In an embodiment of the sixth and/or seventh disclosed aspect, the system comprises a plurality of light sources arranged at different depths in the body of water. Each of the light sources comprises one or more light emitting diodes arranged to emit light when driven by one or more light drivers. The illumination system comprises a plurality of first light sensors arranged with respect to one or more of the plurality of light sources to provide illuminance data for points of interest associated with each of the plurality of light sources. The method comprises receiving a desired illuminance setpoint for each of the plurality of light sources and receiving the illuminance data from the plurality of first sensors and the ambient light data of the at least one second sensor. The method further comprises determining control signals based on the received desired illuminance setpoint, the illuminance data from the plurality of first light sensors and the ambient light data from the at least one second sensor and providing the determined control signals to the one or more light drivers, thereby driving each of the plurality of light sources to emit light of a desired illuminance at the at least one point of interest corresponding to the desired illuminance set point associated with each of the plurality of light sources. In particular, each light source may have its own associated first light sensor arranged within the light source or in the vicinity of the light source such that it can perform an appropriate light measurement at the point of interest associated with the first light sensor and to emit light in accordance with an illuminance set point associated with the point of interest.

In an embodiment, the method comprises determining the control signals in dependence on at least one of the species and the stage of development of the aquatic animals. As mentioned above, it has been found that sensitivity of e.g. fish to light profoundly changes according to the species and/or the stage of development.

In an embodiment of the seventh disclosed aspect, the method comprises determining the control signals in order to maintain the sum of the light intensity sensed by the at least one first light sensor and the at least one second light sensor substantially constant over a period of time and/or substantially constant in the depth direction of the body of water. This application enables maintaining a constant light intensity within the body of water irrespective of changes in the ambient light.

In another embodiment of the sixth and/or seventh disclosed aspect, the control signal is determined to control the light emitted from the one or more light sources to map the spectrum sensed by the one or more second light sensors arranged above the surface of the body of water and/or the one or more first light sensors arranged in the body of water. As such, not only the intensity of the light but also spectral characteristics of the ambient light can be copied into the water. Simulation of sun rise and sun set within the water is accordingly enabled.

In another embodiment of the sixth and/or seventh disclosed aspect, the method comprises using an illumination scheme wherein a light intensity level of the light emitted from the at least one light source is increased (e.g. continuously or step-wise) from a first light intensity level to a second light intensity level over a time period of at least one day to two weeks, preferably at least two days to two weeks. The first light intensity level may be at least a factor 10-100 smaller than the second light intensity level. Since the ambient light will change significantly over the time period, the method involves using the ambient light data in order to determine the control signals enabling the light intensity level to be increased according to the illumination scheme.

In another embodiment of the sixth and/or seventh aspect, the method comprises using an illumination scheme wherein the light intensity level is increased at a first rate during a first time period and at a second rate during a second time period, wherein the first rate is lower than the second rate. The advantage of the latter illumination scheme is that a lower first rate can be applied first and after the eye sensity level of the fish is reached, the second (higher) rate can be applied during the second time period. The first and second time periods may be consecutive periods. In order not to disrupt the illumination scheme by variations in the ambient light and/or variation in the optical characteristics of the water, the method involves determining the control signals enabling compensation for any light effects sensed by the first light sensor and/or second light sensor.

It is noted that the invention relates to all possible combinations of features recited above. Thus, all features and advantages of one of the above-disclosed aspects likewise applies to any of the other disclosed aspects.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
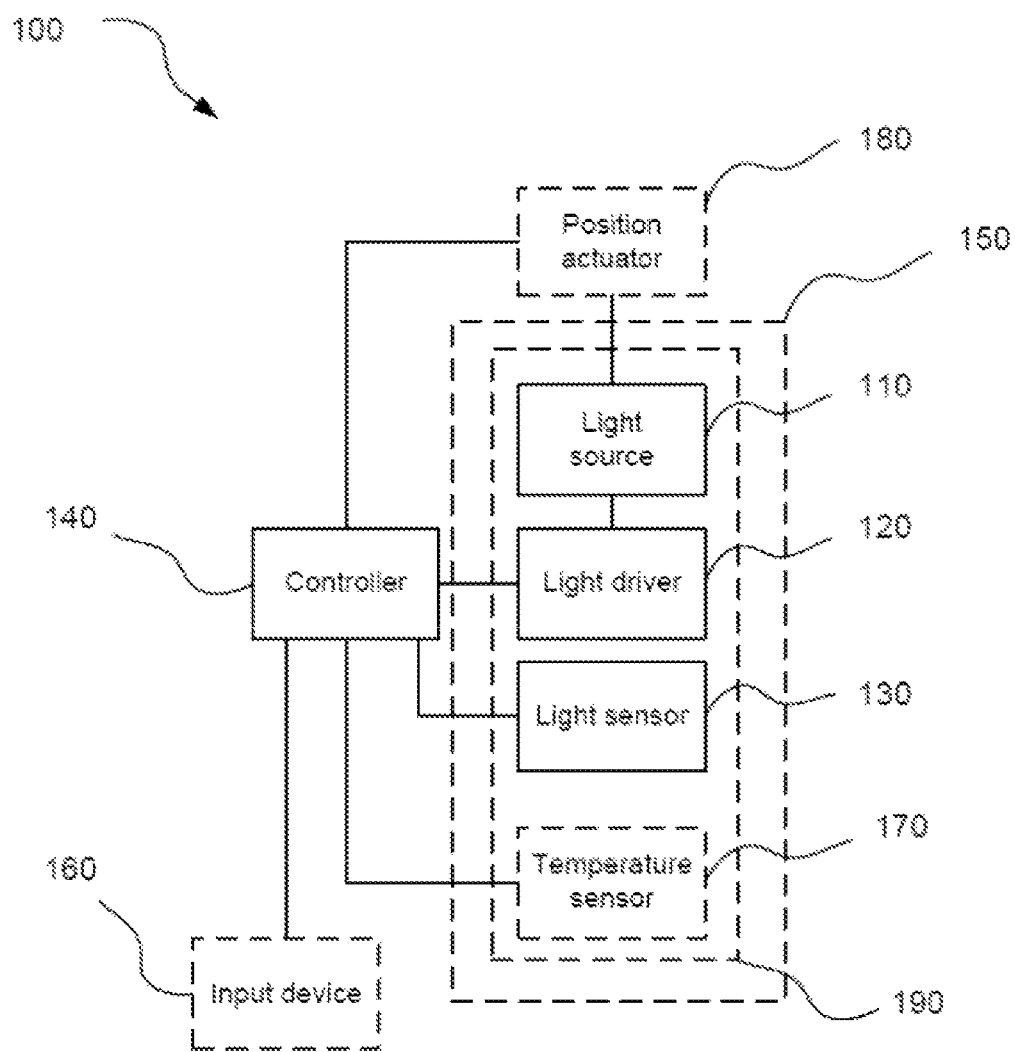
FIG. 1 illustrates an illumination system according to a first aspect of the present disclosure.

Embodiments of the illumination system and method will now be described more fully hereinafter with reference to the accompanying drawings. The system and method may, however, be embodied in many different forms and the scope of protection should not be construed as limited to the embodiments set forth herein; rather, these embodiments are provided for thoroughness and completeness, and to fully convey the scope of the disclosure to the skilled addressee. Like reference characters refer to like elements throughout.

A first aspect of the present disclosure will now be described with reference to FIG. 1, FIG. 3, and the flowchart in FIG. 4.

FIG. 1 is a schematic view of an illumination system 100. The illumination system 100 comprises a light source 110. The light source 110 comprises at least one light emitting diode. The light source 110 is thereby arranged to emit light. The light sources 110 may comprise LED luminaires each containing a plurality of LEDs, e.g. 160 LEDs. The light emitting diodes may cover the entire visible light spectrum of 380-700 nm and may be controlled to emit light of particular spectral characteristics, e.g. a particular color.

The light source 110 is preferably arranged to be immersed in a body of water. The illumination system 100 also comprises a light driver 120 which is operatively coupled to and arranged to drive the light source 110. The light driver 120 can be an LED driver. The illumination system 100 comprises a light sensor 130 which is arranged to provide illuminance data for a particular point of interest 50 located in the body of water, into which the light source 110 is immersed. Both the light driver 120 and the light sensor 130 may optionally be integrated with the light source 110, in a lighting device 190.

The illumination system 100 further comprises a controller 140 which is adapted to receive a desired illuminance setpoint for the point of interest 50 in a step S10.

Optionally, the controller 140 may be operatively connected to an input device 160. The desired illuminance setpoint may be received from this input device 160 or from a data logger, a sensor, a simulation model, etc. An ambient light sensor, as disclosed in further detail below, may be used as a sensor providing input for setting the illuminance setpoint.

In a step S11 the controller 140 is adapted to receive illuminance data from the at least one light sensor 130. Control signals are determined, based on the received desired illuminance setpoint and the received illuminance data, by the controller 140 in a step S12, followed by a step S13 where the determined control signals are provided to the at least one light driver 120. The at least one light driver 120 thereby drives the at least one light source 110 to emit light of a desired illuminance at the at least one point of interest 50.

The desired illuminance may relate to the light intensity and/or the spectrum and/or color of light to be emitted by the light source 110.

The illumination system 100 in FIG. 1 may optionally comprise at least one housing 150 containing at least one of the at least one light source 110. The housing 150 may be arranged to be immersed in the body of water. The housing 150 may optionally comprise the light driver 120. The housing 150 may optionally comprise the light driver 120 and/or the light sensor 130.

The illumination system 100 may further optionally comprise at least one temperature sensor 170. The at least one temperature sensor 170 may be arranged to provide temperature data for the at least one point of interest 50. When the illumination system 100 comprises a temperature sensor 170 the controller 140 may be further adapted to, in a step S14, receive temperature data from the at least one temperature sensor 170. In a step S15 control signals are determined, based also on the received temperature data. The controller 140 then provides the determined control signals to the at least one light driver 120 in a step S16. The at least one light driver 120 thereby drives the at least one light source 110 to emit light of the desired illuminance at the at least one point of interest 50.

The at least one temperature sensor 170 may optionally be integrated with the at least one light source 110.

The illumination system 100 may further comprise at least one position actuator 180. The position actuator 180 is arranged to adjust the depth of immersion of the at least one light source 110 in the body of water. The depth of immersion is associated with a vertical distance between a surface of the body of water and the at least one light source 110. The controller 140 may further be adapted to receive a desired position setpoint for the at least one light source 110 in a step S17, followed by a step S18 where current position data for the at least one light source 110 is determined. In a step S19, control signals are then determined based on the received position setpoint and the determined current position data. The determined control signals are provided, in a step S20, to the at least one position actuator 180. The at least one position actuator 180 thereby positions the at least one light source 110 at a desired position in the body of water.

The position actuator 180 may further be arranged to laterally adjust the position of the at least one light source 110 in the body of water.

Figure 2:
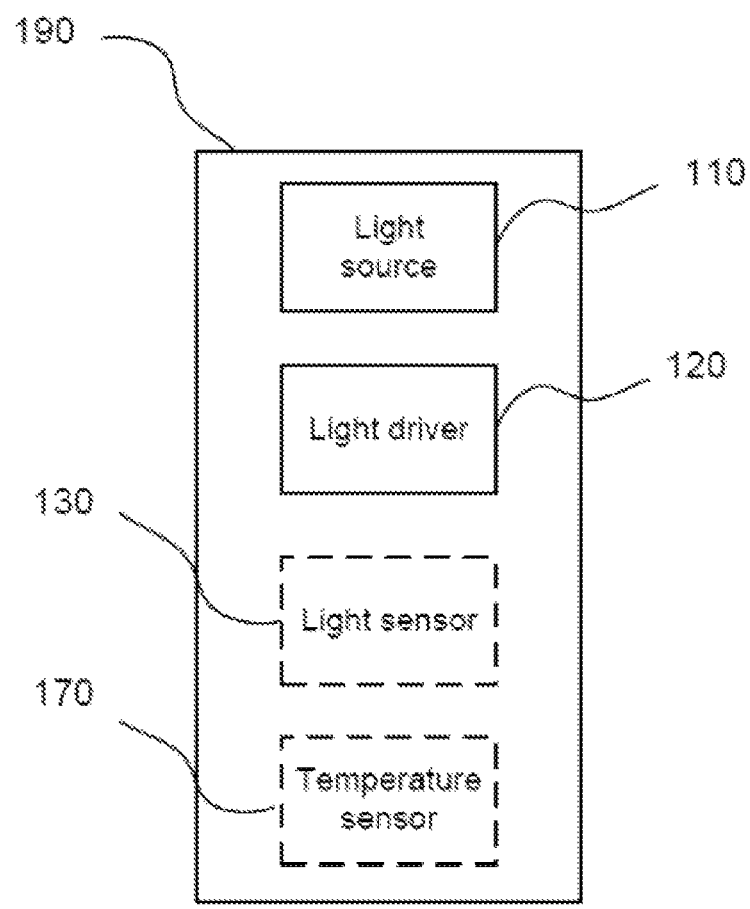
FIG. 2 illustrates a lighting device according to an embodiment of the first aspect of the present disclosure.

FIG. 2 is a schematic view of a lighting device 190 according to an embodiment of the present invention. The lighting device 190 comprises at least one light source 110 and at least one light driver 120. The at least one light driver 120 is arranged to drive the at least one light source 110. Optionally, the lighting device 190 in FIG. 2 may comprise a light sensor 130 and/or a temperature sensor 170.

The lighting device 190 may be encased in a housing 150.

Figure 3:
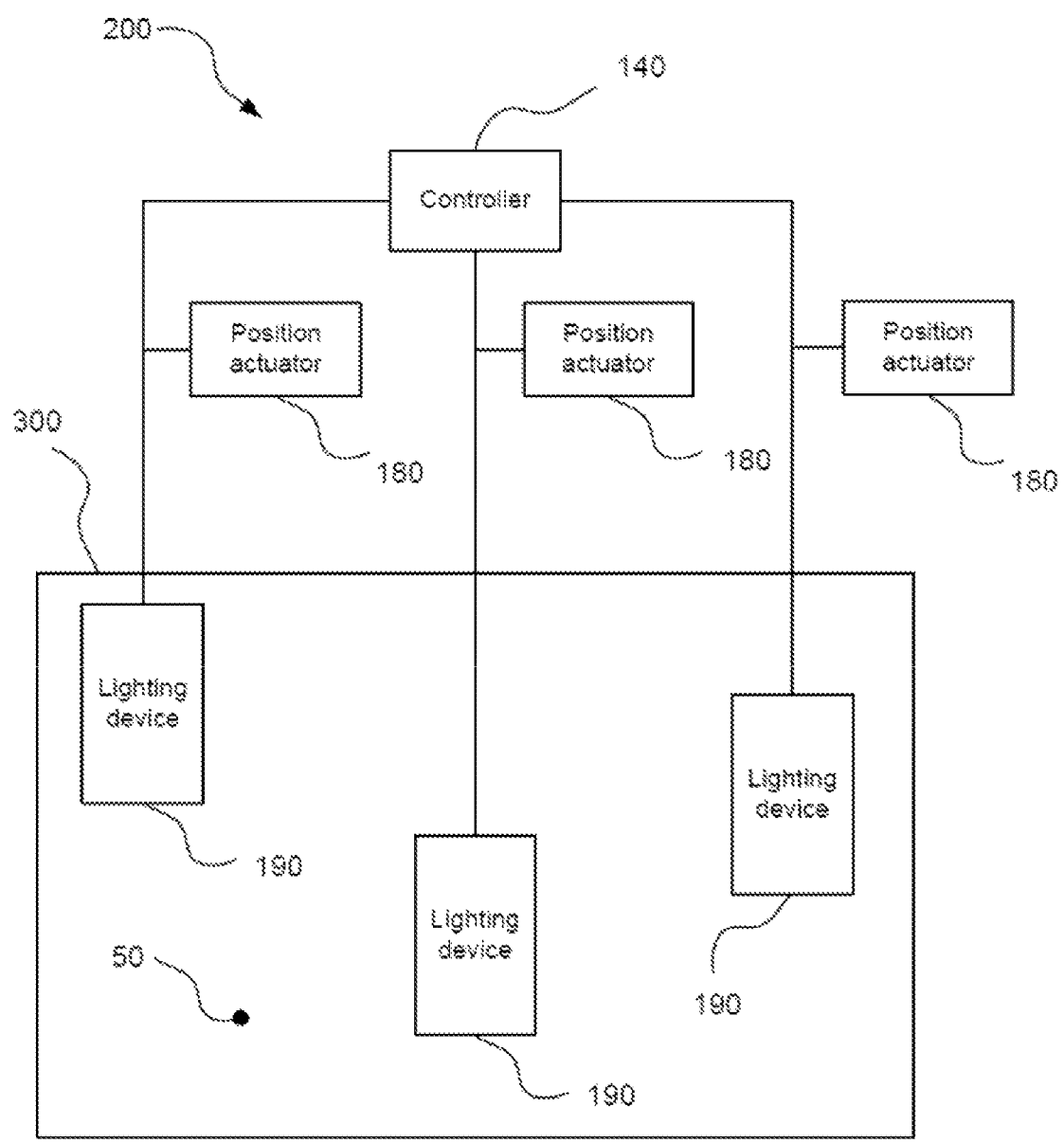
FIG. 3 illustrates an arrangement comprising an illumination system according to the first aspect of the present disclosure.
Figure 4:
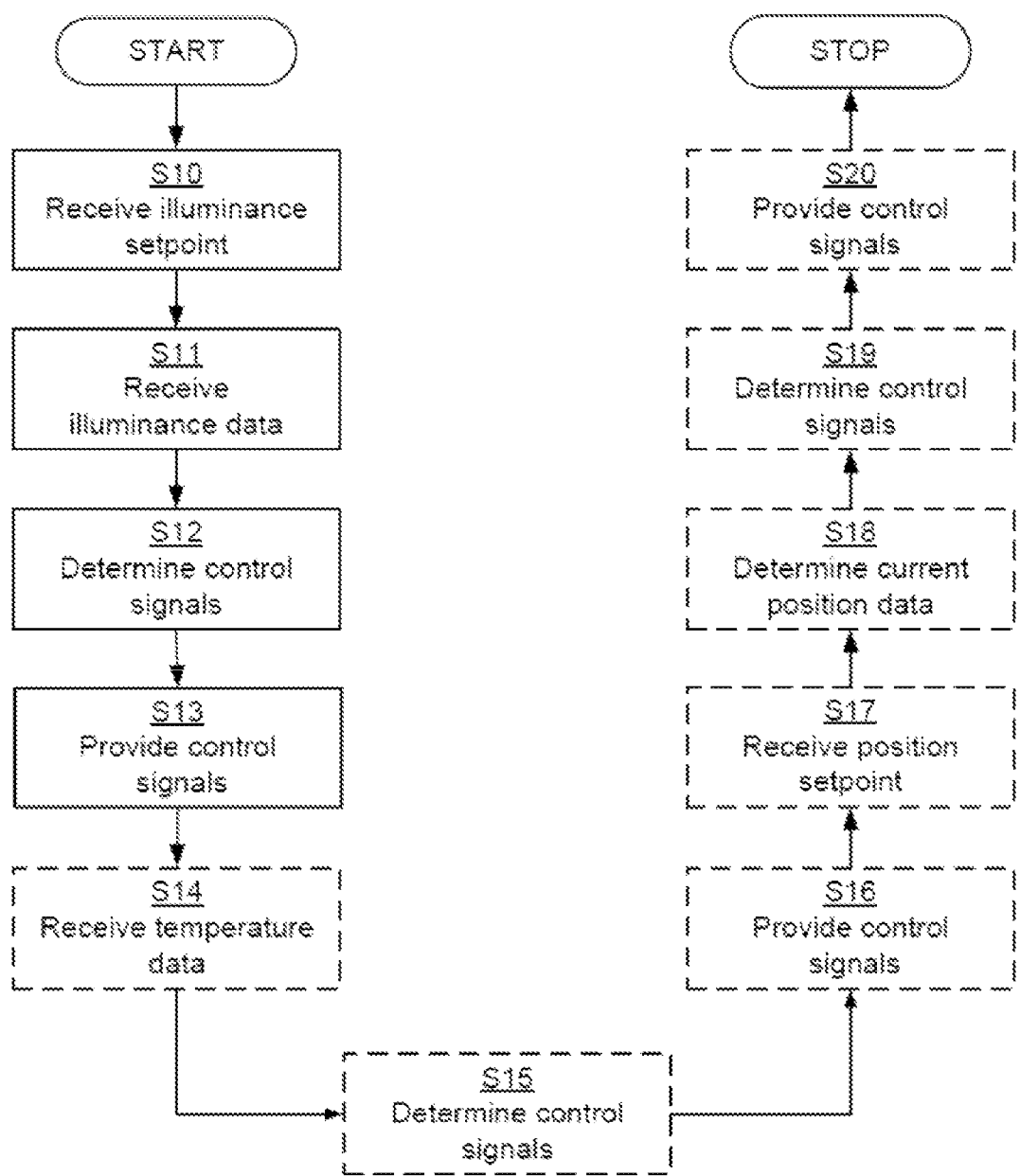
FIG. 4 is a schematic illustration of a method of operating the illumination system according to the first aspect of the present disclosure.

FIG. 3 is a schematic view of an arrangement 200 comprising a plurality of illumination systems as described with reference to FIGS. 1, 2 and 4 and a water cage 300.

The water cage 300 may be a marine net cage or a sea cage.

In one embodiment, the arrangement 200 comprises several immersed lighting devices 190 which can be evenly distributed over the whole volume of the water cage or sea cage. The lighting device 190 improves the visibility of the food so that the fish also is able to find food which has moved to deeper water. The lighting device 190 may be placed in such a way as to produce a more or less even distribution of light points in the water cage 300. The lighting device 190 may be tuned as a function of the natural light conditions in order to compensate for the light loss by absorption in the water. An ambient light sensor, as disclosed in further detail below, may be of assistance in this regard.

Each lighting device 190 may be individually connected to the controller 140. The lighting devices 190 may be individually tuned in order to produce a well-defined light flux or spectrum. Therefore it is possible to create a gradient of light. This may be useful to manipulate fish density during feeding.

The illumination system 100 may optionally comprise at least one food dispenser.

There are many types of fish species, which all have their specific requirements with regards to the optimal temperature for their development. It is therefore advantageous to also take temperature data into account when controlling the light in the fish cultivation environment.

In another embodiment, the immersed lighting devices 190 are combined with temperature sensors 170. This enables the controller 140 to take temperature data into account and to control the light in a way that fish are guided to stay at the right temperatures in the sea cage. The temperature sensors 170 may be connected to some software regulating the position and flux output of the lighting devices 190. The temperature sensors 170 may be separate from the lighting devices 190 or may be integrated onto the cable or wire carrying the current for the lighting devices 190.

When the arrangement is combined with temperature sensors 170, the lighting devices 190 may optionally be variable in height. This is achieved by a position actuator 180. The position actuator 180 is operatively connected to the lighting device 190 or the light source 110. The position actuator 180 may be arranged to vertically adjust the position of the lighting device 190 by adjusting its depth of immersion in the body of water.

The position actuator 180 may further be arranged to laterally adjust the position of the lighting device 190.

Specific knowledge of fish species and their different development stages may then be used together with corresponding data on spectrum, light levels, and photoperiods in order to optimize the environmental conditions for different species of fish.

In summary, a first aspect of the present disclosure relates to an illumination system 100 for cultivation of aquatic animals comprising at least one light source 110, at least one light driver 120 arranged to drive the at least one light source 110, at least one light sensor 130 arranged to provide illuminance data for at least one point of interest 50 in the illumination system 100, and a controller 140. The controller 140 is adapted to provide control signals to the at least one light driver 120 driving the at least one light source 110 to emit light of a desired illuminance at the at least one point of interest 50.

The illumination system according to the present invention enables dynamic control of the lighting conditions in the water cage. The ability to individually control both the light emitted by each light source and the position of the same creates large possibilities to customize and specifically adapt the environment based on type of fish, feeding time, day light variations etc.

Figure 5:
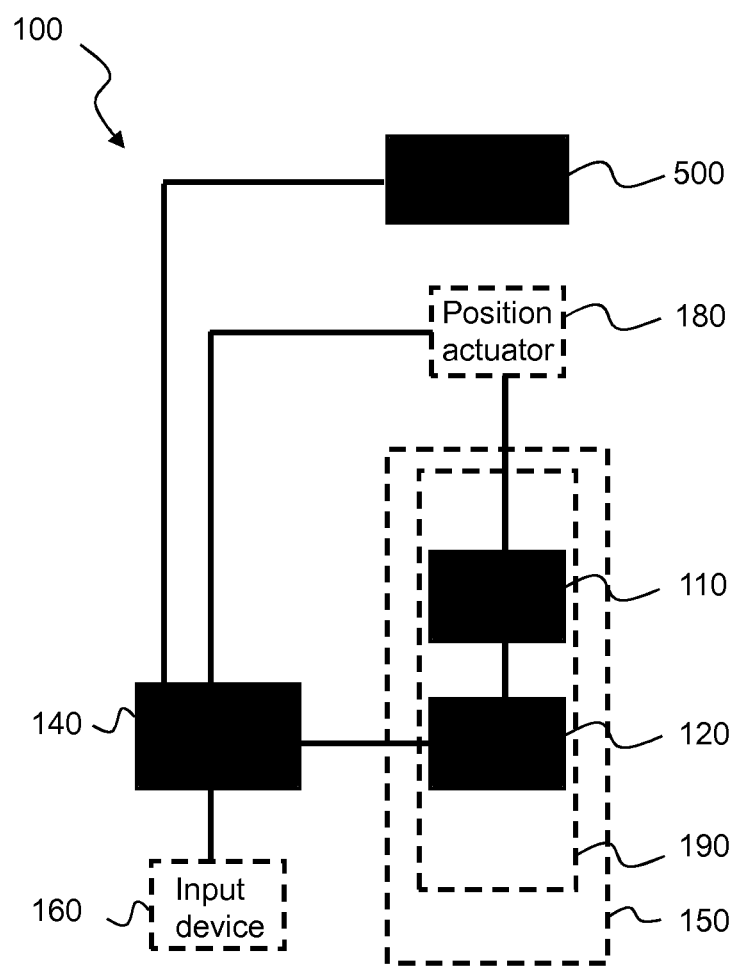
FIG. 5 is a schematic illustration of an illumination system according to a second aspect of the present disclosure.

A second aspect of the present disclosure is schematically illustrated in the illumination system 100 of FIG. 5. Similar components of the illumination system 100 are indicated with identical reference numbers. Further components not shown in FIG. 5 (such as the temperature sensor 170) may also be comprised in the illumination system 100. The illumination system 100 of FIG. 5 does not require a light sensor 130.

The illumination system 100 according to the second aspect of the disclosure particularly comprises at least one light sensor 500. The light sensor 500 is configured to be arranged above the surface of a body of water such that daylight can be sensed, e.g. the light intensity and spectral characteristics. The ambient light characteristics vary over the day (sunrise and sunset) as well as due to weather conditions (e.g. sunny and cloudy). The ambient light sensor 500 senses the optical characteristics above the water surface and provides ambient light data to the controller 140. Controller 140 obtains the ambient light data from the light output sensor signal and determines the control signal for the light driver 120 on the basis of this information. Consequently, the light emitted from the light source 110 (intensity and/or color) can be adapted based on the daylight characteristics sensed by the ambient light sensor 500.

Various applications of the illumination system 100 of FIG. 2 have been envisaged. For example, the day/night rhythm of the ambient light may be followed by controlling the light emitted from the submersed light source 110 in accordance with the intensity and/or the spectrum sensed by the ambient light sensor 500 above the surface of the water. The contribution of the ambient light at the depth of the immersed light source 110 will be different from the light sensed by the ambient light sensor 500 above the surface of the water. A model may be applied within the controller 140 to account for the contribution of the ambient light at one or more different depths.

Figure 6:
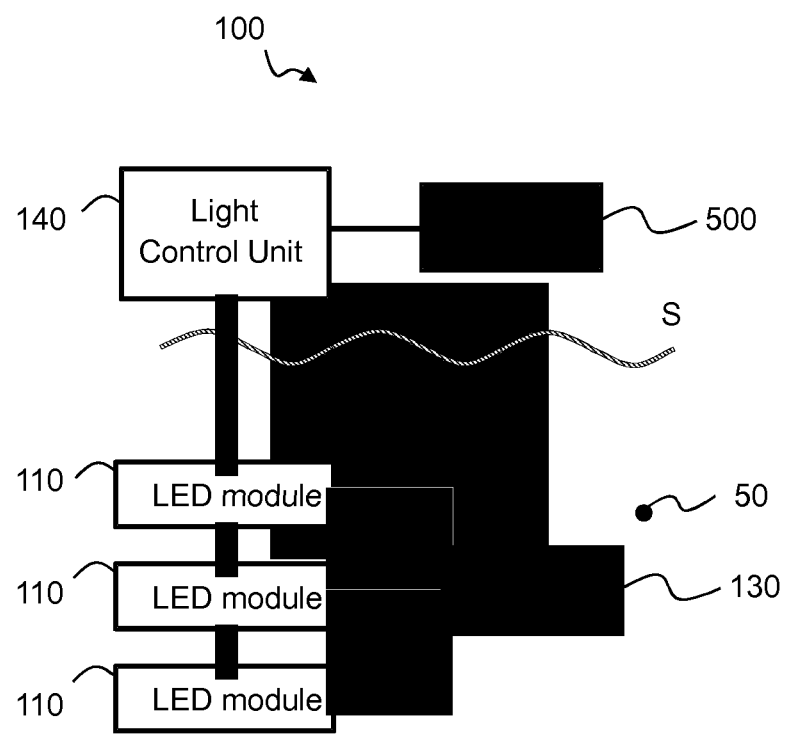
FIG. 6 is a schematic illustration of an illumination system according to a third aspect of the present disclosure.

FIG. 6 is a schematic illustration of another embodiment of an illumination system 100 according to a third aspect of the present disclosure. The illumination system 100 of FIG. 6 again comprises a plurality of submersed light sources 110 (in FIG. 6, LED modules) and a light sensor 500 connected to a controller 140. Controller 140 obtains ambient light data containing optical characteristics of the ambient light above the water surface S and accounts for the optical characteristics of the light when determining the driving parameters for LED modules 110. In addition, the illumination system 100 contains a light sensor 130 arranged within the body water as described with reference to FIGS. 1, 3 and 4.

Light sensor 130 senses optical parameters of the light (illuminance data) within the water at a point of interest 50 and provides this information to the controller 140. The controller 140 is configured for obtaining the information from both light sensors 130, 500 and for controlling light emitted by the LED modules 110 by determining control signals on the basis of the obtained information. This embodiment enables actual measurement of the light (intensity and/or spectrum), in particular the contribution of the ambient light, within the water.

Both the daylight penetrating through the water surface S and the artificial light from LED modules 110 contribute to the light within the water sensed by the light sensor 130. The overall light intensity from the daylight generally decreases in the depth direction. Furthermore, certain wavelengths of the daylight are absorbed to a greater extent than others, so the spectral characteristics of the daylight may also change in the depth direction. At greater depths, typically only natural green light and blue light penetrate. This light is important to particular species of aquatic animals. E.g. salmon has a peak sensitivity to light with wavelengths in the range of 450-550 nm (blue to green). Also, the minimum light intensity level required for salmon is 0.016 $Wm^2$ at fish/pineal gland level or 22.2 W/m2 at the surface for cage culture. The maximum light level that does not induce stress and does not damage eyes of fish is 2.7 $Wm^2$ at 0.1 m from the light source.

The third aspect of the invention also enables relative control of the light conditions within the body of water with respect to the light conditions at the surface S of the body of water. For example, a gradient between light conditions at the surface and light conditions within the body of water at the point(s) of interest can be controlled or set. The ambient light data may be used as input to set the desired illuminance setpoint at the point of interest located in the body of water.

Figure 7:
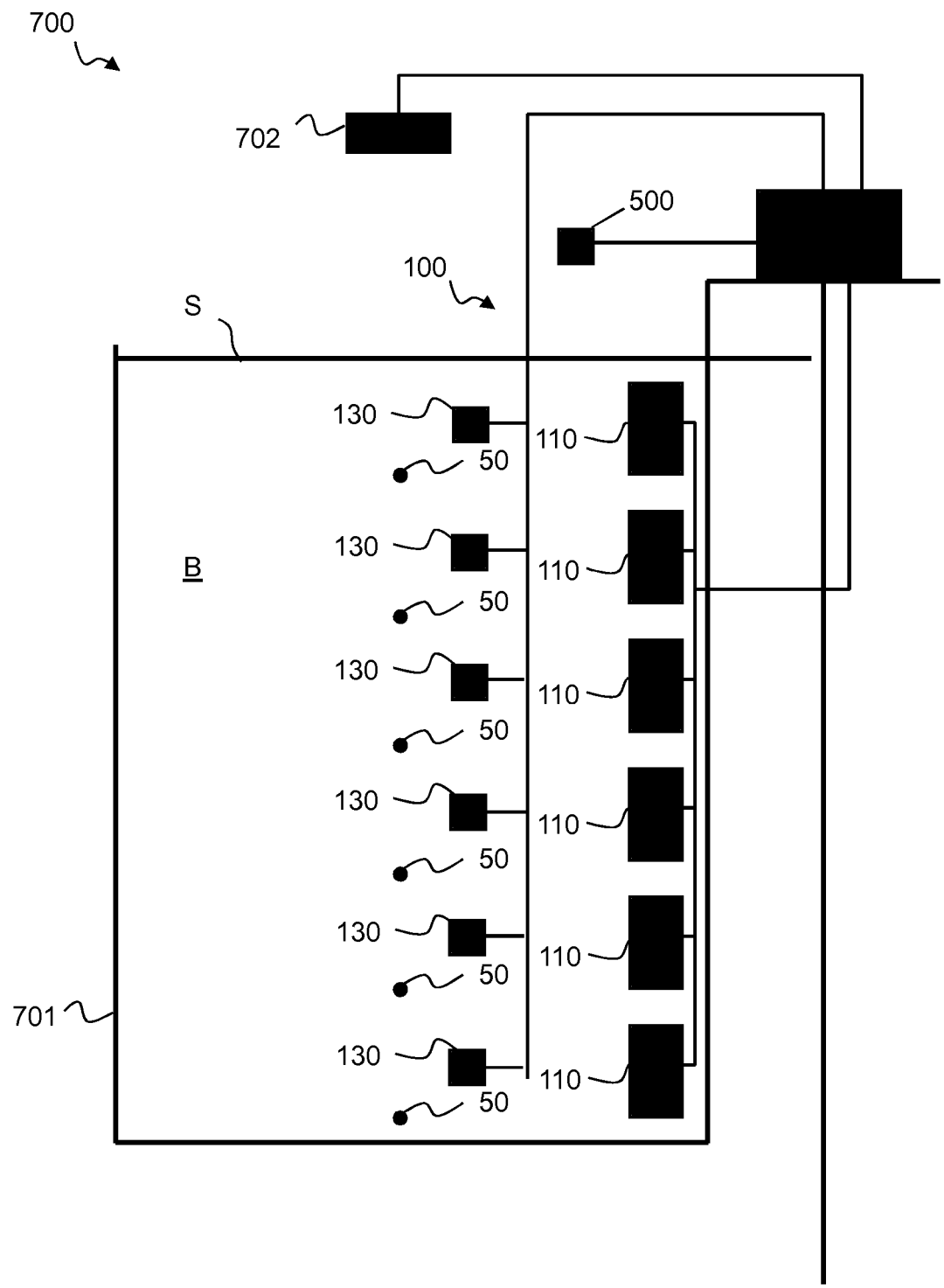
FIG. 7 illustrates an arrangement comprising the illumination system of the third aspect of the present disclosure.

FIG. 7 is a schematic illustration of an arrangement 700 comprising an illumination system 100 and sea cage 701. A food dispenser 702 is also part of the arrangement 700. In order to account for different contributions of daylight depending on the depth below the water surface S and in order to control the light emitted from immersed lighting sources 110 over a significant depth range of the body B of water in a sea cage 701, an illumination system 100 as schematically depicted in FIG. 7 can be used. The illumination by light sources 110 is controlled from controller 140.

One or more daylight sensors 500 are arranged above the surface S of the body B of water. Daylight sensors 500 are connected to controller 140. Furthermore, a plurality of light sensors 130 is arranged with respect to respective lighting devices 110 in a one-to-one relationship. It should be noted that, depending on the particular arrangement, light sensors 110 may also sense light emitted from light sources 110 other than the light source 110 in respect of which it is directly positioned. Each of the light sensors 130 is connected to controller 140 as well. Light sensors 130 may be configured such that only light from the directly arranged line-of-sight light source 110 is sensed.

The controller 140 is arranged for obtaining the ambient light data sensed by light sensor 500 and the illuminance data sensed by the immersed light sensors 130 at points of interest 50 associated with each of the light sensors 130. Controller 140 controls light emitted from light sources 110 on the basis of the ambient light data from light sensor 500 and from the illuminance data from each of the light sensors 130. In particular, the ambient light data from light sensor 500 may be used as input for establishing a desired illumination setpoint in controller 140. Controller 140 may determine driving signals for each of the light sources 110 individually to obtain light corresponding to the illumination setpoint at the points of interest 50 associated with each of the light sensors 130. The driving signals may differ from one light source 110 to another since the ambient light contribution to the light experienced at the points of interest 50 will be different at the respective points of interest.

In one embodiment of the third disclosed aspect, the controller 140 determines the control signal in order to maintain the sum of the light intensity sensed at a light sensor 130 and the ambient light intensity sensed by the at least one light sensor 500 substantially constant over a period of time and/or substantially constant in the depth direction of the body of water. This application enables maintaining a constant light intensity at different points of interest within the body B of water irrespective of changes in the ambient light.

In another embodiment of the second and/or third disclosed aspect, the control signal is determined to control the light emitted from the one or more light sources to map the spectrum sensed by the one or more light sensors 500 arranged above the surface S of the body B of water and/or the one or more light sensors 130 arranged in the body B of water. As such, not only the intensity of the light but also spectral characteristics of the ambient light can be copied into the water. Simulation of sun rise and sun set within the water is accordingly enabled.

Controller 140 may coordinate activation of food dispenser 702 with applying a particular illumination scheme assisted by light sensors 130 and 500.

Figure 8:
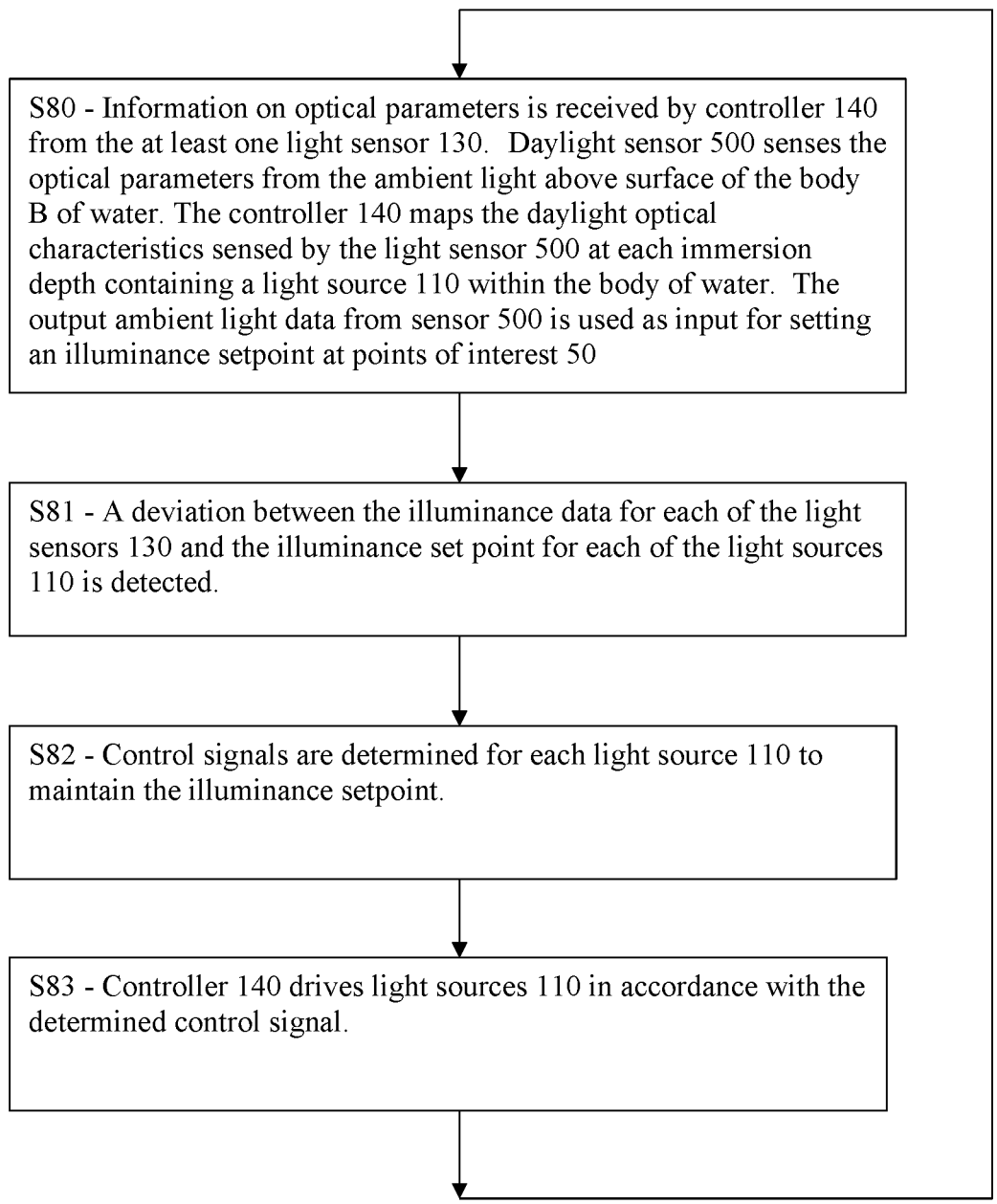
FIG. 8 is a schematic illustration of a method of operating the illumination system according to the third aspect of the present disclosure.

FIG. 8 is a schematic illustration of some steps of the operation of the illumination system 100 as depicted in FIG. 7.

In step S80, information on optical parameters is received by controller 140 from the at least one light sensor 130. Light sensors 130 sense daylight penetrating in the water and light emitted from the lighting source 110. It is assumed that, apart from the daylight contribution, light sensors 130 only sense light from the particular light source 110 directly arranged with respect to that light sensor 130 and that the contribution of light emitted by a neighboring light source 110, if any, is neglible or is not sensed as a result of the configuration of the light sensor 130.

Controller 140 receives the illuminance data from each of the light sensors 130 and determines that the light intensity decreases at sensors arranged at greater depths and that the contribution of wavelengths outside the range 450-550 nm decreases severely at greater depths.

Daylight sensor 500 senses the optical parameters from the ambient light above surface S of the body B of water. Assuming that the controller 140 aims to map the daylight optical characteristics sensed by the light sensor 500 at each immersion depth containing a light source 110 within the body B of water, the output ambient light data from sensor 500 is used as input for setting an illuminance setpoint at points of interest 50. In step S81, a deviation between the illuminance data for each of the light sensors 130 and the illuminance set point for each of the light sources 110 is detected.

In step S82, control signals are determined for each light source 110 to maintain the illuminance setpoint. For example, controller 140 may find that light intensity should be increased with increasing depth of the light source 110 and that lighting devices near the surface emit more light at wavelengths heavily absorbed by water. Accordingly, driving signals may be different dependent on the immersion depth of the light sources 110.

In step S83, controller 140 drives light sources 110 in accordance with the determined control signal.

The process is a quasi-continuous process, wherein variations in the ambient light conditions and/or in the optical parameters of the water are translated in adapted control signals for the lighting devices 130.

It should be noted that the invention is not limited to situations wherein the daylight optical properties sensed by the ambient light sensor 500 are mapped to control signals for the light sources 110. An offset to the daylight properties may e.g. be applied. For example, during the winter, the minimum light emitted from the light sources will by more than the daylight light level causing enhanced fish activity and thus better food uptake. Alternatively, a gradient with respect to the ambient light conditions may be applied for different light sources 110 below the surface S of the water. The gradient may be controlled using other input parameters, such as water temperature at particular immersion depths.

More advanced illumination schemes may be programmed in the controller 140 and daylight sensor 500 and light sensors 130 may assist in complying to the illumination scheme.

For example, an illumination scheme may comprise increasing a light intensity level of the light emitted from the at least one light source from a first light intensity level to a second light intensity level over a time period of at least one day to two weeks, preferably at least two days to two weeks. The first light intensity level may be at least a factor 10-100 smaller than the second light intensity level. Such a scheme is depicted in FIG. 9A.

Figure 9A:
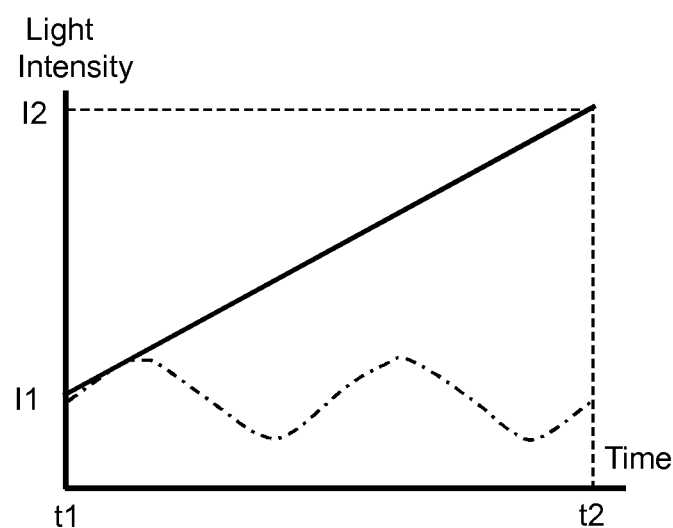
FIGS. 9A and 9B are illustrations of illumination schemes controlled using the method of FIG. 8.

In FIG. 9A, the controller 140 controls the light source(s) 110 to start emitting light in the body B of water at light intensity I1 at time t1. The light intensity is continuously increased to a target light intensity level I2 at time t2. The time period T=t2−t1 is in the range of one day to two weeks, e.g. two days, three days, four days, five days, six days or seven days. Light intensity level I1 may correspond to artificial light of e.g. a radiometric flux density of 0.016 W/m2 which prevents sexual maturation of salmon. If the time period amounts to a period of two days, two nights fall within the time period causing a decrease of at least the ambient light intensity. This is sketched as the dash dotted line in FIG. 5A under the simple assumption of a sinusoid increase and decrease of the light intensity for at the immersion depth of a particular light source 110. The ambient light variation is sensed by ambient light sensor 500 and the effect in the water is sensed by the light sensor 130. Controller 140 takes account of the illuminance data from light sensor 130 (consisting of both the light emitted by the associated light source 110 and the contribution of the ambient light at the point of interest 50) and the ambient light data of the ambient light sensor 500 and determines the control signals for the light source(s) 110 in order to comply to the illumination scheme of FIG. 9A for each of the light sources 110.

Another example includes increasing the light intensity level at a first rate during a first time period SP 1 and at a second rate during a second time period SP 2, wherein the first rate is lower than the second rate. The advantage of the latter illumination scheme is that a lower first rate can be applied first and after the eye sensity level of the fish is reached, the second (higher) rate can be applied during the second subperiod. The first and second time periods may be consecutive periods.

Figure 9B:
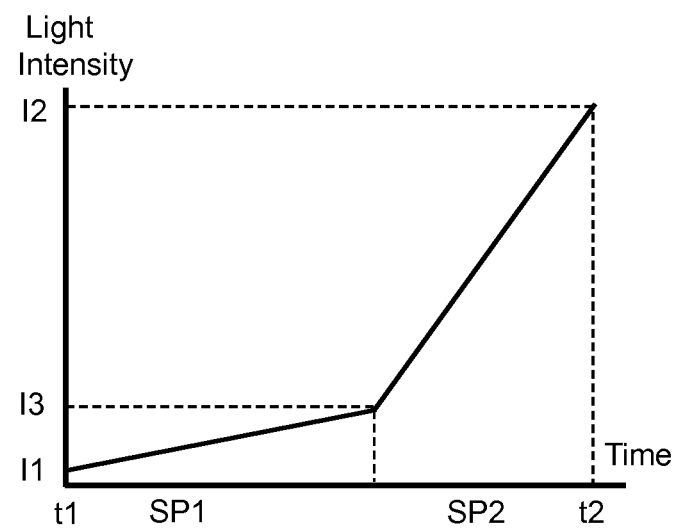

As an example, FIG. 9B is a schematic illustration wherein the light intensity level is first increased slowly for the first light intensity level I1 to a higher light intensity level I3 during a first subperiod SP1. The light intensity level I3 may relate e.g. to the eye sensitivity threshold of the fish. During a second subperiod SP2, the intensity level may then be increased at a higher rate to the final level I2. It should be appreciated that the first and second rate do not need to be linear. For example, the increase from light intensity level I3 to light intensity level I2 may be exponential. The illumination scheme of FIG. 9B may also be disturbed by variations in the ambient light and/or the optical characteristics of the water. Accordingly, as for the illumination scheme of FIG. 9A, controller 140 may take account of the ambient light data from light sensor 500 and the illuminance data of the light sensor(s) 130 and determine the driving control signals for the light source(s) 110 in order to comply to the illumination scheme of FIG. 9B for each of the light sources.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The person skilled in the art realizes that the present invention by no means is limited to the preferred embodiments described above. On the contrary, many modifications and variations are possible within the scope of the appended claims.

The invention claimed is:

1. An illumination system for cultivation of aquatic animals in a body of water comprising:
a plurality of light sources, each light source comprising at least one light emitting diode arranged to emit light, said plurality of light sources being arranged to be immersed in a body of water,
at least one light driver arranged to drive said plurality of light sources,
at least one light sensor arranged to provide illuminance data for at least one point of interest located in said body of water,
at least one ambient light sensor to provide ambient light data from sensing ambient light above the surface of the body of water, and
a controller, wherein said controller is adapted to
receive a desired illuminance setpoint for said at least one point of interest;
receive said illuminance data for said at least one point of interest from said at least one light sensor;
model light conditions within the body of water using the illuminance data at said point of interest and said ambient light data to account for a contribution of the ambient light at different depths;
determine control signals for said plurality of light sources based on said model and the received desired illuminance setpoint; and
provide said determined control signals to said at least one light driver, thereby driving said plurality of light sources to achieve light of a desired illuminance at said at least one point of interest;
wherein said plurality of light sources are adapted to be individually controllable with respect to at least one of a light flux, a peak brightness and a spectrum in order to produce said light of said desired illuminance at said at least one point of interest.

2. The illumination system according to claim 1, further comprising:
wherein the controller is further adapted to receive the ambient light data from the at least one ambient light sensor;
determine the control signals based on the ambient light data.

3. The illumination system according to claim 2, wherein the controller is adapted to use the ambient light data as input for determining the illuminance setpoint.

4. The illumination system according to claim 1, comprising:
a plurality of light sources, wherein each of the light sources is arranged at a different immersion depth in the body of water;
each of the light sources comprises one or more light emitting diodes arranged to emit light when driven by one or more light drivers;
a plurality of light sensors arranged with respect to one or more of the plurality of light sources to provide illuminance data for points of interest associated with each of the plurality of light sensors;
wherein the controller is adapted to
receive a desired illuminance setpoint for each of the light sources and receive illuminance data from each of the light sensors for the points of interest
receive ambient light data from at least one ambient light sensor;
determine control signals based on the received desired illuminance setpoint, the illuminance data from the plurality of light sensors and, optionally, the ambient light data from the at least one ambient light sensor;
providing control signals determined for each of the light sources to the one or more light drivers, thereby driving the light sources to emit light of a desired illuminance at the point of interest corresponding to the desired illuminance set point associated with each of the plurality of light sources.

5. The illumination system according to claim 1, wherein said at least one light sensor is integrated with said at least one light source.

6. An arrangement for cultivation of aquatic animals, said arrangement comprising:
an illumination system according to claim 1 and
a water cage, wherein said illumination system is arranged to illuminate said water cage and wherein said at least one point of interest is located within said water cage.

7. The illumination system according to claim 1, wherein the depth of immersion of each of said plurality of light sources in said body of water are positioned by the controller to produce an even distribution of light points in the body of water.

8. The illumination system according to claim 1, further including at least one position actuator arranged to adjust a depth of immersion of each of said plurality of light sources in said body of water, wherein said depth of immersion is associated with a vertical distance between a surface of said body of water and said at least one light source, wherein said controller is further adapted to
receive a desired position setpoint for each of said plurality of light sources;
determine current position data for each of said plurality of light sources;
determine control signals based on said received position setpoint and said determined current position data;

provide said determined control signals to said at least one position actuator, thereby positioning each of said plurality of light sources at a desired position in said body of water.

9. A method for controlling light in an illumination system for cultivation of aquatic animals, said illumination system comprising a plurality of light sources, each light source comprising at least one light emitting diode arranged to emit light, said plurality of light sources being arranged to be immersed in a body of water, at least one light driver arranged to drive said plurality of light sources, at least one light sensor arranged to provide illuminance data for at least one point of interest being located in said body of water, at least one ambient light sensor to provide ambient light data from sensing ambient light above the surface of the body of water and a controller, said method comprising the steps of:
- receiving a desired illuminance setpoint for said at least one point of interest;
- receiving said illuminance data for said at least one point of interest from said at least one light sensor;
- receiving the ambient light data from the at least one ambient light sensor in a controller;
- modeling light conditions using the illuminance data at said point of interest and said ambient light data to account for a contribution of the ambient light at different depths;
- determining control signals for said plurality of light sources based on said model and the received desired illuminance setpoint;
- providing said determined control signals to said at least one light driver, thereby driving said plurality of light sources to achieve light of a desired illuminance at said at least one point of interest;
- wherein said determining comprises determining individual control signals for said plurality of light sources in order to produce said light of said desired illuminance at said at least one point of interest;
- wherein said determining comprises determining individual control signals with respect to at least one of a light flux, a peak brightness and a spectrum for said plurality of light sources in order to produce said light of said desired illuminance at said at least one point of interest.

10. The method according to claim 9, further comprising the step of using the ambient light data as input for determining the illuminance setpoint.

11. The method according to claim 9, in an illumination system, comprising a plurality of light sources, wherein each of the light sources is arranged at a different immersion depth in the body of water, each of the light sources comprising one or more light emitting diodes arranged to emit light when driven by one or more light drivers, a plurality of light sensors arranged with respect to one or more of the plurality of light sources to provide illuminance data for points of interest associated with each of the plurality of light sensors, the method comprising the steps of:
- receiving a desired illuminance setpoint for each of the light sources and receive illuminance data from each of the light sensors for the points of interest
- receiving ambient light data from at least one ambient light sensor;
- determining control signals based on the received desired illuminance setpoint, the illuminance data from the plurality of light sensors and, optionally, the ambient light data from the at least one ambient light sensor; and
- providing control signals determined for each of the light sources to the one or more light drivers, thereby driving the light sources to emit light of a desired illuminance at the point of interest corresponding to the desired illuminance set point associated with each of the plurality of light sources.

12. The method according to claim 9, wherein said system further comprises at least one temperature sensor arranged to provide temperature data for said at least one point of interest, said method further comprising the steps of:
- receiving said temperature data from said at least one temperature sensor;
- determining control signals based also on said received temperature data;
- providing said determined control signals to said at least one light driver, thereby driving said at least one light source to emit light of said desired illuminance at said at least one point of interest.

13. The method according to claim 9, further including the step of adjusting a depth of immersion of each of said plurality of light sources in said body of water, wherein said depth of immersion is associated with a vertical distance between a surface of said body of water and each of said plurality of light sources, said adjusting including the steps of receiving a desired position setpoint for each of said plurality of light sources determining current position data for each of said plurality of light sources, determining control signals based also on said received position setpoint and said determined current position data, providing said determined control signals to said at least one position actuator, thereby positioning each of said plurality of light sources at a desired position in said body of water.

* * * * *